J. W. SIBBET.
Bolt Heading Die.
No. 57,781. Patented Sept. 4, 1866.
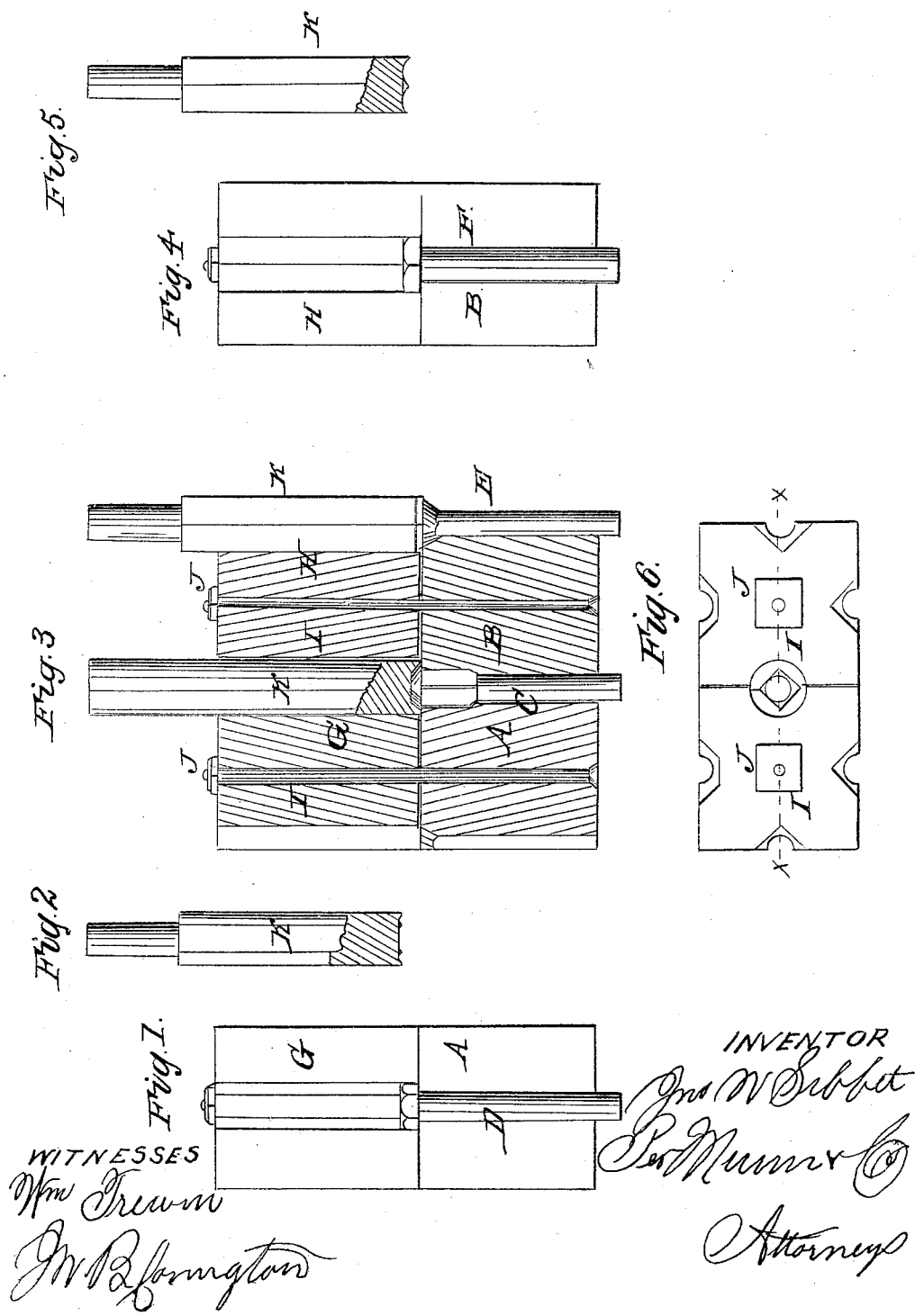

UNITED STATES PATENT OFFICE.

JOHN W. SIBBET, OF CINCINNATI, OHIO.

IMPROVEMENT IN DIES FOR BOLT-HEADING MACHINES.

Specification forming part of Letters Patent No. 57,781, dated September 4, 1866.

*To all whom it may concern:*

Be it known that I, JOHN W. SIBBET, of Cincinnati, in the county of Hamilton and State of Ohio, have invented a new and useful Improvement in Dies for Heading Bolts; and I do hereby declare that the following is a full, clear, and exact description thereof, which will enable others skilled in the art to make and use the same, reference being had to the accompanying drawings, forming part of this specification, in which—

Figure 1 is a side view of one part of my improved die, showing a headed bolt in the groove. Fig. 2 is a side view of the header which fits into the groove, one-half of which is shown in Fig. 1, a part of said header being broken away to show the form of the face. Fig. 3 is a vertical section of my improved dies, taken through the line $x\,x$, Fig. 6. Fig. 4 is a side view of a part of my improved dies, showing a headed bolt in place. Fig. 5 is a side view of the header which fits into the groove, one-half of which is shown in Fig. 4, a part being broken away to show the form of the face. Fig. 6 is a top view of my improved dies in position for forming a round-headed bolt.

Similar letters of reference indicate like parts.

My invention has for its object to furnish dies for heading bolts of any size or length, having heads of any desired shape, and having square or round necks, as may be desired; and it consists, first, of improved dies formed in parts, constructed, arranged, and combined with each other, as hereinafter more fully described; and, second, in the combination, with the dies, of headers constructed as hereinafter more fully set forth.

A and B are the lower parts of the dies, which are made in the form of square blocks. On each of the side faces of these blocks are formed grooves of the size of the rod from which the bolts are to be made.

If it is required that the bolts C should have a square neck, the upper part of the grooves are cut into a square form for the required distance, as shown in Figs. 3 and 6. The upper parts of these grooves are also cut out to give any desired form to the under side of the bolt-heads, as shown with reference to the bolts D E F.

The upper parts, G and H, of the dies are also made in the form of square blocks, as shown in the drawings. The faces of the parts G and H are also grooved, and these grooves are made in the shape of the desired bolt-heads, as shown.

The pieces A G and B H are pivoted and clamped together by bolts I and nuts J, as shown in Fig. 3, so that by revolving the upper and lower parts of the dies upon each other heads of any desired form may be given to the bolts. These grooves in the upper parts, G and H, of the dies also serve as guides and slides to the headers K as they move forward to form the heads of the bolts.

The bodies of the headers K are made of the same shape as the grooves in which they slide, and their lower ends or faces are cut into the form which is desired to be given to the heads of the bolts, as shown in Figs. 2, 3, and 5.

What I claim as new, and desire to secure by Letters Patent, is—

1. Improved dies formed in sections and upon the several faces thereof, constructed, arranged, and combined with each other, substantially as herein described, and for the purposes set forth.

2. The combination, with the above, of the headers K, constructed substantially as described, and for the purpose set forth.

The above specification of my invention signed by me this 10th day of February, 1866.

JOHN W. SIBBET.

Witnesses:
FRED. VOTTELER,
JOHN T. ENGLISH.